United States Patent [19]

Jones

[11] 4,146,686

[45] Mar. 27, 1979

[54] PHENOLIC RESIN COMPOSITION AND A BATTERY SEPARATOR IMPREGNATED THEREWITH

[75] Inventor: Robert T. Jones, Pelham, Mass.

[73] Assignee: Monsanto Company, St. Louis, Mo.

[21] Appl. No.: 871,317

[22] Filed: Jan. 23, 1978

[51] Int. Cl.² ............................................ H01M 2/16
[52] U.S. Cl. .................................. 429/250; 528/137; 528/159
[58] Field of Search ................ 429/250, 253; 528/137, 528/159

[56] References Cited

U.S. PATENT DOCUMENTS

| 2,773,114 | 12/1956 | McAuslan | 429/250 |
| 2,882,331 | 4/1959 | Zenczak | 429/253 |
| 2,980,750 | 4/1961 | Mills | 429/253 |
| 3,247,025 | 4/1966 | Beaulieu et al. | 429/250 |
| 3,297,638 | 1/1967 | Beaulieu | 429/253 |

*Primary Examiner*—Donald L. Walton
*Attorney, Agent, or Firm*—David Bennett; William J. Farrington; James C. Logomasini

[57] ABSTRACT

This invention relates to an improved resin composition comprising an admixture of a phenol-aldehyde resole resin and a particular surface active rewetting agent wherein said rewetting agent being a reaction product of a polypropylene glycol and maleic anhydride.

11 Claims, No Drawings

PHENOLIC RESIN COMPOSITION AND A BATTERY SEPARATOR IMPREGNATED THEREWITH

SUMMARY OF THE INVENTION

Permeable cellulosic fibrous battery separators are used extensively in batteries of either the conventional wet lead-acid type or the so-called "dry charge" lead-acid type. It is necessary that the fibrous structures thereof be protected from attack by the acid employed in the batteries. Therefore, when cellulosic fibrous battery separators are employed, they consist of cellulosic sheets impregnated with a phenol-aldehyde type of resin, which resin, when advanced to the infusible state, protects the fibers of the cellulosic sheet from attack by the acid. In addition, it is necessary that the battery separators absorb or become rewetted by the battery acid rapidly, particularly in the so-called "dry charge" lead-acid type. This is essential so that the electrical resistance of the separator will reach its minimum value, within as short a time as possible after addition of the battery acid. This requires incorporating a surface active rewetting agent with the phenol-aldehyde type of resin. To function properly, however, the surface active rewetting agent must allow rapid rewetting of the battery separator by the battery acid must remain stable at high temperatures and must not leach out with water or with an acid solution.

The resistance of the surface active rewetting agent to leaching out by water or by the acid solution is important. If the surface active rewetting agent should leach out, it can result in poor negative plate formation when forming the battery. This will, in turn, reduce cell capacity, require higher charge voltages and reduce the useful service life of the battery.

U.S. Pat. No. 3,247,025 discloses phenolic resin compositions for impregnating battery separators wherein the rewetting agents are the reaction products of a polyoxyalkalene compound and a cyclic anhydride wherein the polyoxyalkalene compound contains terminal hydroxy groups. These rewetting agents have not been found to be as efficient as those of the present invention based on the reaction products of polypropylene glycols and maleic anhydride wherein the glycols have secondary hydroxyl groups.

Therefore, it is an object of this invention to provide a composition comprising in admixture a phenol-aldehyde resin and a particular surface active rewetting agent.

It is another object of this invention to provide an improved fibrous battery separator impregnated with the composition of this invention.

The following examples are set forth to illustrate more clearly the principle and practice of this invention to those skilled in the art and not to be construed as limitations on the invention. Unless otherwise stated all parts and percentages are on a weight basis.

SUMMARY OF THE INVENTION

The present invention is related to an improved resin composition for battery separator impregnation comprising an admixture of a phenol-aldehyde resole resin and a particular surface active rewetting agent wherein the improvement comprises said rewetting agent being a reaction product of a polypropylene glycol and maleic anhydride.

The present invention also relates to a cellulosic fibrous permeable battery separator impregnated with a resin composition comprising an admixture of a phenol-aldehyde resin and are wetting agent being the reaction product of a polypropylene glycol and maleic anhydride.

EXAMPLE 1

Preparation of Half-Ester Rewetting Agent 100 grams (0.025 mol) of Dow Polyglycol P4000 (a 4000 MW difunctional polypropylene glycol from Dow Chemical Company), 5.3 g. maleic anhydride (0.054 mol) and 2.3 g. 85% phosphoric acid (0.024 mol) are charged to 250 ml flask, and the flask is purged with nitrogen. With agitation, the flask is heated to 90° C. and held for 3 hours. The flask is then cooled and the product checked by IR. The IR curve shows complete reaction of anhydride as evidenced by the absence of the anhydride peak at 5.4 microns. The product is the maleic acid monester with polypropylene glycol.

EXAMPLE 2

Preparation of the Full-Ester Rewetting Agent 100 grams (0.025 mol) of Dow Polyglycol P4000, 1.24 grams (0.0126 mol) of maleic anhydride are charged to a 250 ml three necked flask and the flask is purged with nitrogen. With agitation the flask is heated to 100° C. where it is held 1 hour. The flask is then cooled to 70° C. and 50 grams of toluene are added. The mixture is then heated to 125° C. at atmospheric pressure, while distilling off toluene and water. After 1 hour at 125° C. the mixture is cooled to 40° C. and neutralized to pH 7.1 with 23 ml of 0.5N NaOH (0.0115 mol). The mixture is then heated to 72° C. at 24" Hg vacuum to remove additional toluene. The mixture when cooled has a Owens Solids (2g+10 ml MeOH, 2 hrs. at 150° C. in gravity oven) of 80.2%. The product is the full ester of maleic acid with polypropylene glycol.

EXAMPLE 3

Preparation of a Salt Containing Resole 700 grams (7.44 mols) phenol, 980 grams 50% formaldehyde (16.32 mols) and 21 grams 50% caustic (0.26 mol) are charged to a kettle and heated to a 60°–70° C. vacuum reflux. When at reflux a slurry of 28 grams hydrated lime (0.38 mol) in 56 grams water is added over a 15 minute period. The batch is reacted at 60°–70° C. to a 4% free formaldehyde end point. During this time 319 grams of distillate are removed. When the end-point is reached the batch is cooled to 45° C. where a solution of 52.5 grams oxalic acid dihydrate (0.42 mol) in 157.5 grams water is added. The resin is then refrigerated for storage. This resin is designated Resin A.

EXAMPLE 4

Treating of Cellulosic Sheets

Resin A, after the addition of wetting and rewetting agents, is used to treat permeable cellulosic sheets by hand dipping the sheets in the diluted (with water) resin until the sheets are thoroughly impregnated. Excess resin is then removed by passing the sheets through squeeze rolls and curing them for 10 minutes at 175° C. The concentration of the treating solution is adjusted to give cured separators with a resin content of 40%. The following separators are made:

| Separator | Resin | Wetting Agent | Rewetting Agent | |
|---|---|---|---|---|
| 1 | A | 2.1% Aerosol OT* | 1% Dow Polyglycol P4000 | |
| 2 | A | " | 1% Ex. 1 half ester | |
| 3 | A | " | 1% Ex. 2 full ester | |
| 4 | A | " | 1% U.S.P. 3,247,025 Ex. 1 | |

*dioctyl sodium sulfo succinate available from American Cyanamide

Wetting and rewetting agent levels are given as percent active material on resin solids.

EXAMPLE 5

Wetting and Rewetting Test

The separators prepared in Example 4 are cut into 2 inch squares and stored in a dessicator. To determine the wettability of the separators the squares are gently floated on the surface of a 14.3% sulfuric acid solution until they are completely wetted. The time of wetting is measured with a stopwatch. After the samples are completely wet, they are submerged in the acid solution for 5 minutes. They are then placed in a 60°–70° C. water bath where they are washed with hot running water for at least 1 hour. The samples are then removed, blotted free of excess water and dried for 10 minutes at 110° C. The dried samples are returned to the dessicator. To determine the rewettability of the separators the squares are floated on the surface of a 36.8% solution of sulfuric acid and the time to complete rewetting is measured with a stopwatch. Using this procedure the following results were obtained.

| Separator | Wetting Time | Rewetting Time |
|---|---|---|
| 1 | 1.6 seconds | >180 + >180 seconds |
| 2 | 1.3 seconds | 12 + 25 seconds |
| 3 | 1.3 seconds | 30 + >120 seconds |
| 4 | 1.4 seconds | 75 + 180 seconds |

EXAMPLE 6

Resin B is prepared by a procedure that is similar to that of Resin A except that it contains 5% (on phenol) of a calcium ligonsulfonate. Resin C is prepared by a procedure that is similar to that of Resin A except that it contains 0.5% (on phenol) of Reax 27, a Kraft lignin available from West Virginia Pulp and Paper Company. Resin D is similar to Resin A. The following results were obtained with these resins.

| Separator | Resin | Wetting Agent | Rewetting Agent | Rewetting Time |
|---|---|---|---|---|
| 5 | B | 2.1% Aerosol OT | 1% Dow Polyglycol P4000 | >200 + >200 seconds |
| 6 | B | " | 1% Ex. 1 half ester | 6.7 + 7.1 seconds |
| 7 | B | " | 1% U.S.P. 3,247,025 Ex. 1 | 28.3 + 30.7 seconds |
| 8 | C | " | 1% Ex. 1 half ester | 60 seconds |
| 9 | C | " | 1% U.S.P. 3,247,025 Ex. 1 | >300 seconds |
| 10 | D | 1.05% Aerosol OT | 1% Dow Polyglycol P4000 | >100 + >100 seconds |
| 11 | D | " | 1% Ex. 1 half ester | 2 + 2 seconds |
| 12 | D | " | 1% U.S.P. 3,247,025 Ex. 1 | 15 + 20 seconds |

EXAMPLE 7

Preparation of Half-Ester Rewetting Agent

Example 1 is repeated except that the charge is 100g (0.024 mol) BASF Wyandotte Pluracol TP 4040 (a 4100 MW trifunctional polypropylene glycol), 7.5g (0.077 mol) maleic anhydride, and 2.3g (0.024 mol) 85% phosphoric acid. The reaction is held at 90° C. for 8 hours.

EXAMPLE 8

Resin D is prepared by a procedure similar to that of Resin A except that it is neutralized to pH 7.8 with oxalic acid and then to pH 6.7 with sulfuric acid. The following results were obtained with separators prepared from this resin.

| Separator | Resin | Wetting Agent | Rewetting Agent | Rewetting Time |
|---|---|---|---|---|
| 13 | D | 2.1% Aerosol OT | 0.575% U.S.P. 3,247,025 Ex. 1 | 36 seconds |
| 14 | D | 2.1% Aerosol OT | 0.575% Ex. 1 half ester | 8 seconds |
| 15 | D | 2.1% Aerosol OT | 0.575% Pluracol TP4040 | 6 seconds |
| 16 | D | 2.1% Aerosol OT | 0.575% Ex. 7 half ester | 7 seconds |

Additional advantage of ½ esters over P-4000 + TP-4040 bases is improved water compatibility (clear solutions on dilution of resin with water).

This invention is directed to a resin composition comprising in admixture a phenol-aldehyde resin and a particular surface active rewetting agent. It has been surprisingly discovered that by employing the particular surface active rewetting agent of this invention with a phenol-aldehyde resin which composition is used to impregnate permeable cellulosic fibrous sheets to prepare battery separators therefrom, an effect is obtained which results in the battery separators having excellent rewettability.

Any phenol-aldehyde resin may be employed in the practice of this invention. Particularly useful, however, are the phenol-formaldehyde resins which are generally prepared by the reaction of about 0.5–3.0 mols of formaldehyde per mol of phenol in the presence of appropriate catalysts. The phenol-formaldehyde resins may be either a one-stage resin recovered in water, a one-stage resin recovered in a water-organic solvent or a liquid novolac two-stage resin having water associated with it. The preparation of these resins is generally well-known and the type of phenol-formaldehyde resin obtained depends upon the ratio of formaldehyde to phenol and the catalyst chosen for the reaction. As is well known in the art, the catalyst employed in the reaction may be either acidic or basic in nature. The preferred phenol-aldehyde resin to be employed in the practice of this invention is a phenol-formaldehyde resin prepared by reacting 1.0–3.0 mols of formaldehyde per mol of phenol in the presence of an alkaline catalyst and wherein the reaction product is recovered in water. The phenol-formaldehyde resin employed in the practice of this invention should also have a water tolerance of 0.1 volume of water per equal volume of resin to greater than 50 volumes of water per volume of resin. However, as a practical limit, the water tolerance should be at least 2 volumes of water per one volume of resin.

Typical examples of other phenol-aldehyde resins which can be employed in the practice of this invention are resorcinol-formaldehyde, catechol-formaldehyde resins having an alkyl group containing 1-3 carbon atoms such as xylenol-formaldehyde, etc.

When employing the resin composition of this invention, the composition should consist of 0.1-5 parts of the surface active rewetting agent of this invention per 100 parts by weight of the phenol-aldehyde resin solids. Preferably, the resin composition should consist of 0.5-3 parts by weight of the surface active rewetting agent per 100 parts by weight of the phenol-aldehyde resin solids.

This invention is also directed to a cellulosic fibrous permeable battery separator consisting of a permeable cellulosic fibrous sheet impregnated with the resin composition of this invention and wherein the phenol-aldehyde resin is advanced to the infusible state. The cellulosic fibrous battery separator of this type is generally prepared by first admixing the phenol-aldehyde resin and the surface active rewetting agent. The surface active rewetting agent may be added either as 100% active materials or as a solution in a solvent compatible with the surface active active agent and the phenol-aldehyde resin. The cellulosic fibrous sheet is then treated with the composition of this invention by either the wet-web saturation method or the dry-web method. In either method, it may be desirable to dilute the resin composition in order to obtain the desired pickup. The treated cellulosic sheet is dried to remove excess solvent and is then subjected to a temperature of about 200° F. to about 600° F. in order to advance the phenol-aldehyde resin to an infusible state. The time of exposure of the treated cellulosic fibrous sheet to these temperatures will vary from approximately 30 minutes at 200° F. to at least 1 minute at 600° F. In addition, the cellulosic fibrous battery separator is generally ribbed to increase its resistance to degradation during use thereof in a lead-acid battery. Generally, it is also desirable to impregnate the cellulosic fibrous sheet with about 20-50 weight percent of the resin composition of this invention.

Alternatively, the cellulosic fibrous sheet may be first treated with the phenol-aldehyde resin alone, and secondly, in a separate operation, treating the cellulosic fibrous sheet with the surface active rewetting agent either before or after subjecting the phenol-aldehyde treated fibrous sheet to the elevated temperatures.

Although the preferred battery separator employed in the practice of this invention is a cellulosic fibrous permeable structure having a Gurley porosity of about 1-25 seconds when using a 5 oz. cylinder and a ¼ sq. in. orifice, other battery separator structures may be prepared by either incorporating the resin composition of this invention or just the surface active agent alone. For example, the resin composition may be used to bind and coat battery separators prepared from glass fibers or diatomaceous earth or combinations of both with or without cellulosic fibers. In addition, the surface active rewetting agent alone may be incorporated in polyvinyl chloride separators, hard rubber separators or other materials wherein speedy rewettability by the battery acid solution is desired.

The advantages of this invention are found in that the battery separators employing the resin composition of this invention are rapidly rewetted by the battery acid solution. The electrical resistance of the battery separator rapidly reaches its minimum value well within 10 minutes after addition of the battery acid to the battery. This advantage allows almost immediate use of the so-called "dry-charge" lead-acid battery without injuring the battery separators or the battery itself.

A wetting agent can be optionally used in combination with the rewetting agent is not critical to rewetting since it is washed out during battery separator fabrication. Aerosol OT, a dioctyl sodium sulfo succinate has been found to be functional. Other wetting agents equally as functional are—sodium diamyl sulfo succinate and other sodium dialkyl succinates of the anionic types. The wetting agent can be present in the composition in beneficial amounts of 0.1 to 5% by weight based on the resole resin, preferably 0.5 to 3% by weight.

The polypropylene glycol which is used to esterify the maleic anhydride are those prepared by conventional means such that the molecular weight is at least 1250, and ranging from about 1250 to about 10,000 preferably 2000 to 5000. The polypropylene glycols of the present invention have secondary hydroxyl groups. These are also known as polyoxypropylene glycol compounds and can be formed as reaction product of propylene oxide and propylene glycol as disclosed in U.S. Pat. No. 2,674,619. These polyoxypropylene glycols are difunctional or multifunctional as to secondary hydroxyl groups depending on how many propylene glycol end groups are incorporated in the polymer. Difunctional polyoxypropylene glycol is available as Polyglycol P4000 from the Dow Chemical Company having a molecular weight of 4000. A trifunctional polyoxypropylene glycol is available from BASF Wyandotte as Pluracol TP4040 having a molecular weight of about 4100. The polyoxypropylene glycols or polypropylene glycols have the general formula:

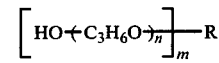

wherein n is the number of propylene oxide units and R is an alkyl radical formed from a polyhydric alcohol and m is the number of alcohol groups of the polyhydric alcohol, the hydroxyl groups being secondary hydroxy groups.

The ester can be the mono-ester or diester of maleic anhydride or maleic acid. It is preferred to use maleic anhydride in preparing the ester in that the water of condensation does not have to be removed.

The reaction product of polypropylene glycol and maleic anhydride can take the form of the monoester and is characterized by the formula:

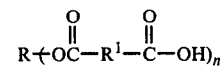

where R is the monoester residue of any propylene glycol compound containing secondary hydroxyl groups, $R^1$ is an alkyl radical of 2 carbon atoms and n is an integer from 1-10 but never more than the secondary hydroxyl groups attached to the polypropylene glycol compound.

The reaction product of polypropylene glycol and maleic anhydride can take the form of the diester characterized by the formula:

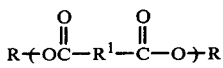

where R is the diester residue of any polypropylene glycol compound containing secondary terminal hydroxyl groups, $R^1$, is an alkyl radical of 2 carbon atoms.

The rewetting agent can be the reaction product of about 1 mol of polypropylene glycol with about 1.5 to 2.5 mols of maleic anhydride to form the monoester or half ester.

The rewetting agent can be the reaction product of about 1 mol of polypropylene glycol and 0.25 to 0.75 mols of maleic anhydride to form the diester or full ester.

It will thus be seen that the objects set forth above, among those made apparent from the description, are efficiently attained and since changes may be made in carrying out the above process and in the composition set forth without departing from the scope of this invention, it is intended that all matters contained in the above description shall be interpreted as illustrative and not in a limiting sense.

What is claimed is:

1. An improved resin composition for battery separator impregnation comprising an admixture of a phenol-aldehyde resole resin and a particular surface active rewetting agent wherein the improvement comprises said rewetting agent being a reaction product of a polypropylene glycol containing secondary hydroxyl groups and maleic anhydride.

2. A composition of claim 1 wherein said reaction product is characterized by the formula:

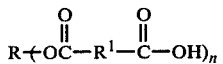

wherein R is the monoester residue of any polypropylene glycol compound containing secondary hydroxyl groups, $R^1$, is an alkyl radical of 2 carbon atoms and n is an integer from 1–10 but never exceeding the number of secondary hydroxyl groups attached to the polypropylene glycol compound.

3. A composition of claim 1 wherein said reaction product is characterized by the formula:

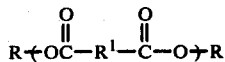

where R is the diester residue of any polypropylene glycol compound containing secondary terminal hydroxyl groups, $R^1$, is an alkyl radical of 2 carbon atoms.

4. A composition of claim 1 wherein a wetting agent is used in combination with said rewetting agent.

5. A composition of claim 1 wherein said admixture comprises about 100 parts of said resin and about 0.1 to 5 of said rewetting agent.

6. A composition of claim 2 wherein said rewetting agent is the reaction product of about 1 mol of polypropylene glycol with about 1.5 to 2.5 mols of maleic anhydride to form said monoester.

7. A composition of claim 3 wherein said rewetting agent is the reaction product of about 1 mol of polypropylene glycol and 0.25 to 0.75 mols of said maleic anhydride to form said diester.

8. A composition of claim 1 wherein said phenol-aldehyde resole resin comprises:
  A. A resole resin having a number average molecular weight is less than about 300, a water tolerance greater than 50%, a combined formaldehyde to phenol ratio in the range of from about 1.0:1 to 3.0:1, and
  B. a dispersion of insoluble oxalate salt particles, wherein said resole being prepared with a catalyst comprising alkaline earth metals hydroxides selected from the group consisting of magnesium, calcium, barium, strontium and mixtures thereof, said pH being adjusted with a compound selected from the group consisting of oxalic acid, ammonium oxalate and mixtures thereof providing a stable dispersion of insoluble oxalate salt particles of said alkaline earth metal ions in said solution, wherein said solution is stable to salt flocculation at a resole resin content of from about 60 to 99% by weight.

9. A composition of claim 8 wherein said dispersed insoluble oxalate salt is calcium oxalate.

10. A cellulosic fibrous permeable battery separator impregnated with a resin composition comprising an admixture of a phenol-aldehyde resin and a rewetting agent being the reaction product of a polypropylene glycol containing secondary hydroxyl groups and maleic anhydride.

11. A battery separator of claim 10 wherein the resin composition comprises 20–50 percent by weight of said battery separator.

* * * * *